United States Patent [19]

Watanabe et al.

[11] 4,097,124
[45] Jun. 27, 1978

[54] ZOOM LENS

[75] Inventors: Rinzo Watanabe; Masatoshi Shimojima, both of Tokyo, Japan

[73] Assignee: Vivitar Corporation, Santa Monica, Calif.

[21] Appl. No.: 429,348

[22] Filed: Dec. 28, 1973

Related U.S. Application Data

[63] Continuation-in-part of Ser. No. 258,816, Jun. 1, 1972, Pat. No. 3,784,285.

[51] Int. Cl.² ............................................. G02B 15/18
[52] U.S. Cl. ............................................. 350/187
[58] Field of Search ................... 350/187, 186, 255

[56] References Cited

U.S. PATENT DOCUMENTS

| 3,090,282 | 5/1963 | Angenieux | 350/187 X |
|---|---|---|---|
| 3,169,461 | 2/1965 | Erbe et al. | 350/255 |
| 3,731,987 | 5/1973 | Iida et al. | 350/187 |
| 3,765,748 | 10/1973 | Mito | 350/187 |

FOREIGN PATENT DOCUMENTS

| U17,579 | 6/1964 | Japan | 350/187 |
|---|---|---|---|
| 46-33495 | 10/1971 | Japan | 350/187 |

*Primary Examiner*—Conrad J. Clark
*Attorney, Agent, or Firm*—DeLio and Montgomery

[57] ABSTRACT

This disclosure relates to variable focal lens having zooming and compensating groups movable axially in a non-linear relation. A single operating member is rotatable to move the front focusing group without moving the other groups, and movable axially to shift the zooming and compensating groups without moving the focusing group. Axial movement is imparted to the mount for the zooming group, and relative movement of the compensating group is controlled by rotative movement of the zooming group.

16 Claims, 7 Drawing Figures

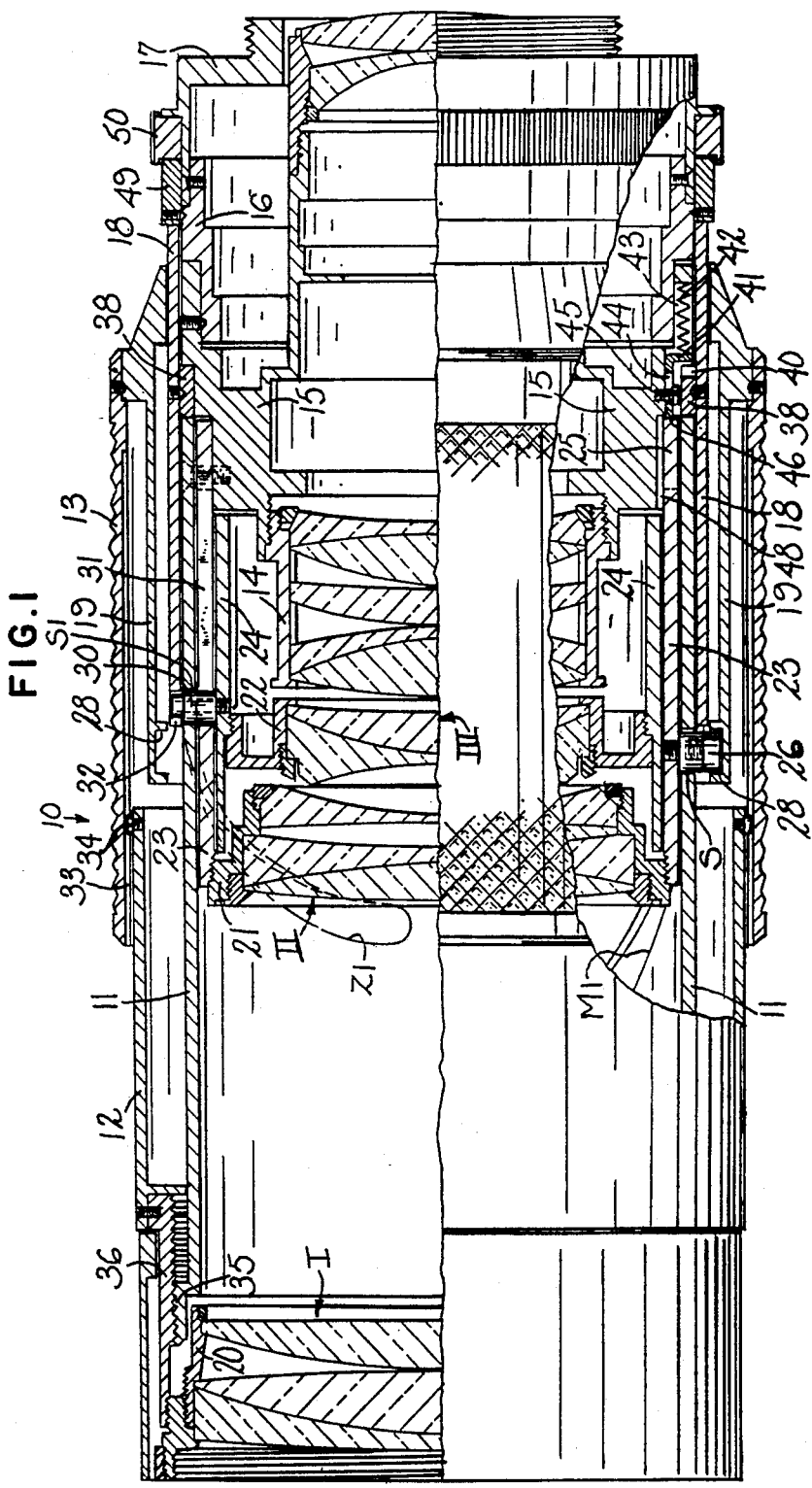

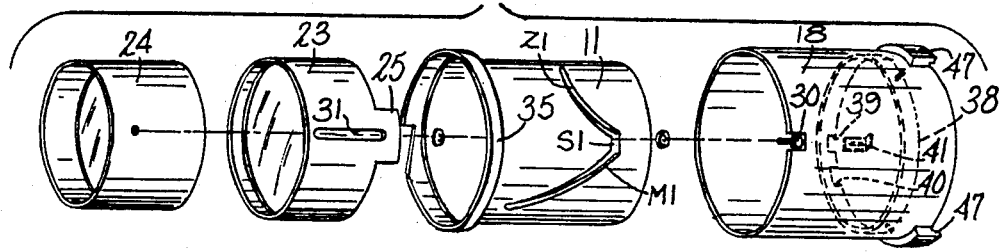
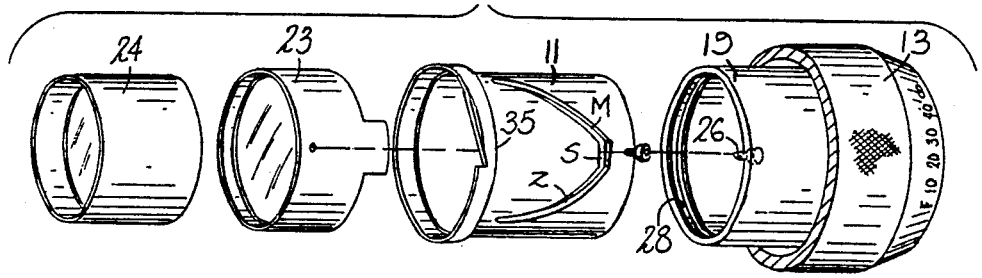
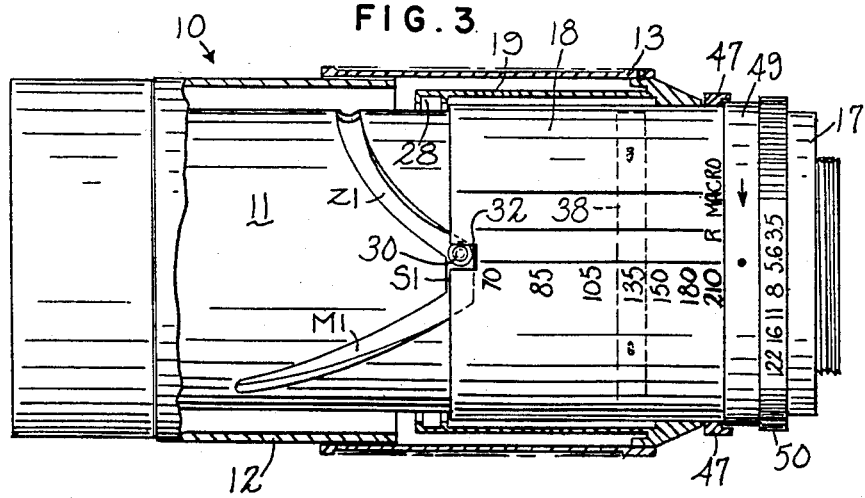

ZOOM LENS

This application is a continuaton-in-part of my co-pending application Ser. No. 258,816, filed June 1, 1972, now U.S. Pat. No. 3,784,285.

This invention relates to lenses and more particularly relates to variable focal length or zoom lenses.

Zooming lenses of the type using a front focusing group followed by a zooming group and image plane position compensation group, otherwise known as a compensating group, are quite widely known. Lenses of this type generally utilize two operating members, one for focusing and the other for clearing the equivalent focal length of the lens. Some lenses have been provided utilizing a single operating member which is moved axially on the lens barrel for zooming and which is rotated on the lens barrel for focusing. Such a lens is shown in U.S. Pat. No. 3,169,461. The construction as shown in that patent is relatively uncomplicated where only a single movable zooming group is utilized.

However, where there must be two or more axially movable lens groups in a zoom lens, means must be provided to present predetermined relative movement between the lens groups as each are moved axially.

Accordingly, the present invention provides a new and improved construction for a zoom lens utilizing a single operating member for both focusing and zooming which facilitates non-linear relative axial motion of two lens groups within a lens housing. More specifically, the operating member is arranged so that as it moves axially on the lens housing and moves one axially movable lens group, the motion imparted to the said one axially movable lens group imparts predetermined axial motion to the second movable lens group.

Briefly stated, the invention in one form thereof, comprises a lens having a cylindrical member with first and second guide slots defined therein. A first lens group has a mounting member with a pin extending therefrom into a first of the guide slots and therethrough to be received in an annular channel in the operating member. The first mounting member also has an axial slot defined therein. A second lens group is in a second mounting within the first mounting member and has a pin extending therefrom through the axial slot into the second guide slot. When the operating member is moved axially it moves the first pin in the first slot in both an axially and tangential direction, and as the first guide means rotates the sides of the axial slot engage the second pin and move it in the second guide slot so that predetermined non-linear relative motion is imparted to both of the movable lens groups.

An object of this invention is to provide a new and improved zoom lens for a still camera.

Another object of this invention is to provide a new and improved mechanism for imparting non-linear relative motion to two movable lens groups.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 1 is a side longitudinal half section partly cut away of the lens assembly embodying the invention;

FIGS. 2a and 2b are exploded, isometric views of the movable lens elements of the lens of FIG. 1;

FIG. 3 is a top plan view of the lens of FIG. 1 with the focusing barrel cut away to expose the zoom tube;

Figure 4:
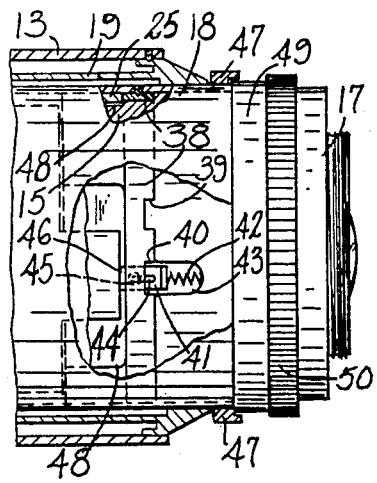
FIG. 4 is a schematic diagram of the lens elements of the lens of FIG. 1.

As shown in FIG. 1, an overall lens 10 embodying the invention comprises a cylindrical lens housing member or zoom tube 11, a focusing member 12, a focus and zoom ring or operating member 13 adapted to rotate member 12 and also slide longitudinally with respect thereto, housing members 14, 15 and 16 adapted to mount the fixed objective, hereinafter identified as Group IV, and a camera mount 17 secured to member 16. Tube 11 is fixed to member 14. The mount 17 as shown has a thread-type attachment. However, it may have a bayonet-type attachment dependent upon the camera body to which the lens 10 will be mounted.

The lens 10 further includes a mode selector ring or barrel 18 disposed about tube 11 and member 14, a focus and zoom ring support 19 which is rotatable and slidable with respect to barrel 18, a lens mount 20 for the focusing lens group I, a lens mount 21 for zoom lens group II and a lens mount 22 for the compensating lens group III. Lens mount 21 and lens group II are carried at one end of a ring 23 which may be considered as part or an extension of the mount of group II, while lens mount 22 and lens group III are carried in a zoom tube or ring 24 within ring 23. Ring 24 may be considered as part or an extension of the mount of group III. Ring 23 has extensions 25 thereon as will be more clear from exploded views of FIGS. 2a and 2b.

FIG. 2b illustrates essentially the same elements as FIG. 2a but with the parts rotated 180°. FIG. 2a shows the mode ring 18 while FIG. 2b shows the focus and zoom ring 13 with the forwarded portion thereof cut away. The purpose of extensions 25 is to release a detent switch to permit the lens to be used in a zooming mode of operation or a macro mode. U.S. Pat. No. 3,784,285 discloses and claims the mechanism for providing both zooming and macro modes of operation. The macro mode of operation is mentioned herein only because of common drawings. For a complete description of the macro mode of operation and the selection thereof reference is made to U.S. Pat. No. 3,784,285.

During the zoom mode of operation, lens group II is moved along the length of tube 11 to vary the equivalent focal length (EFL) of the lens while compensating group III moves at a predetermined rate with respect to the zooming lens primarily to compensate for the image plane shift which occurs during zooming. While lens group III primarily acts as a compensator, it also cooperates with group II to vary the focal length. As will hereinafter be explained during the macro mode of operation, lens groups II and III move in fixed relation to focus an object at a very close distance to the lens.

A guide pin 26 is threadably received in tube 23 and extends therefrom through either a guide slot Z or a cam slot M in tube 11. The end of pin 26 is received within a channel 28 defined in the end of focus and zoom ring support 19.

With this arrangement, it will be seen that as focus and zoom ring 13 is moved linearly along tube 11, the pin in channel 28 will move in one of slots Z or M to impart a predetermined forward and reverse movement determined by the contour of cam slots Z or M, with respect to the linear movement of ring 13. A guide pin 30 extends from ring 24 through a longitudinal slot 31 in ring 23, through either of cam slots Z1 or M1 in tube 11 and into a cutout or recess 32 in mode ring 18. It will be noted that cam slots M and M1 in opposite sides of tube 11 have the same contour, while cam slots Z and Z1 have substantially different contours. As will hereinafter be more fully explained during a zooming mode of operation, the guide pins 26 and 30 move in cam slots Z and Z1, respectively, while the same pins move in cam slots M and M1, respectively, during the macro mode of operation. Otherwise stated, there is a first pair of guides Z and Z1 for lens groups II and III during zooming and a second pair of guides M and M1 for close-up focusing.

In FIG. 1, the lens is shown with the lens groupings in position for a maximum focal length. Focusing is effected by rotating ring 13. Ring 13 receives in a slot 33 therein pin or screwheads 34 extending from focusing member 12. Thus member 12 will rotate with ring 13, and on focusing threads 35 on tube 11 to cause lens mount 20 attached to member 36 to advance or retract with respect to tube 11.

If it is desired to change the focal length from the maximum towards the minimum, ring 13 is moved longitudinally with respect to tube 11 and carries therewith pin 26 in channel 28. Pin 26 moves in cam slot Z in tube 11 and carries therewith tube 23 and lens group II mounted therein. Tube 23 may move longitudinally with respect to tube 24 by virtue of the slot 31 therein through which guide pin 30 extends. The rotary movement of tube 23 produces relative movement of guide pin 30 due to the walls defining slot Z1. Therefore, pin 30 will move in slot Z1 at a predetermined rate and distance relative to tube 23. Lens group III moves at a predetermined longitudinal rate with respect to lens group II.

With this related movement, ring 13 may be operated along tube 11 to vary the EFL of the lens system between the maximum and minimum design EFL's. Curves showing the relative movement of lens groups II and III with respect to lens groups IV during the zooming mode of operation are set forth in FIG. 5.

When it is desired to change to the macro mode of operation, ring 13 is moved to the maximum EFL position as shown in FIG. 1. This enables the guide pins 26 and 30 to enter connecting slots 3 and S1 between the cam slots Z, M and Z1 and M1, respectively, in tube 11. At this time, pin 30 is extending through slot 31 in zoom tube 23, slot S1 and into recess 32 in mode ring 18.

Figure 5:
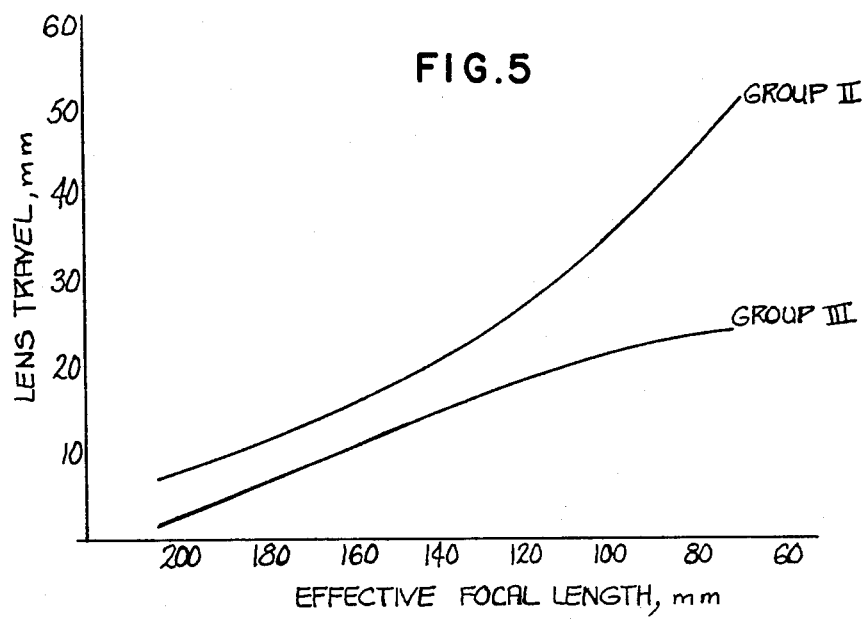
FIG. 5 is a curve showing the relative movement of the zooming elements during a zooming mode of operation.

Disposed within mode ring 18 at the end of tube 11 is a selector latch ring 38 seen more clearly in FIG. 2a, which has two detent recesses 39 and 40 defined therein and adapted to receive a detent latch member 41. As shown in FIGS. 1, 4 and 5, latch member 41 is acted upon by a spring 42 received in a slot 43 defined by the outer periphery of member 16 and mode ring 18. Member 41 has a slot 44 therein which receives therethrough a threaded guide pin 45 carried in member 15.

Latch member 41 is thus movable under or against the influence of spring 42 a predetermined distance defined by the length of slot 43. As shown in FIGS. 1 and 4, latch 41 is in an unlatched position without detent 40 by virtue of the fact that extension 25 of zoom tube 23 has engaged the leading edge 46 and moved member 41 back against the bias of spring 42. Mode ring 18 may now be rotated to allow latch 41 to enter detent 39 and switch to the macro mode of operation.

As more clearly shown in FIG. 3, when the lens is to be switched to the macro mode of operation, the zoom ring will be fully retracted, pin 30 will be received in recess 32 of mode ring 18. Then mode ring 18 is rotated in the direction of the arrow to move pin 30, and therefore to the other end of slot S1 so that pin 30 may now move in slot M1. At the same time pin 26 will rotate in slot S to a position where it may enter cam slot M.

Slots M and M1 are arranged to provide equal movement of tubes 22 and 23. Ring 13 together with support member 19 and its channel 28 are moved longitudinally along tube 11. The movement of ring 13 causes pins 26 and 30 to follow cam slots M and M1, respectively, and lens groups II and III move for close focusing with a fixed distance therebetween.

The ring 50 is the usual aperture setting adjustment. Such construction and the connection to the adjustment therefore are well known in the art and are not set forth here to simplify the disclosure.

The first or focusing group is effective to focus an object from infinity to 1.8 meters and is a three-element construction with a positive convex-concave double convex cemented doublet and a single double convex positive lens. Therefore, the first group is positive.

Group II is the zooming lens and is a three-element construction of a double convex, double concave cemented doublet and a double concave negative lens. The second group or zoom lens therefore is of negative power.

Group III is a two-element cemented construction with a double concave, convex-concave construction, and is of negative power.

Group IV is a telephoto type lens utilizing a seven-element construction and is a positive lens group.

The optics herein described are disclosed and claimed in the copending application of Rinzo Watanabe and Ellis Betensky, Ser. No. 258,780, filed June 1, 1972 now U.S. Pat. No. 3,817,600.

Figure 6:
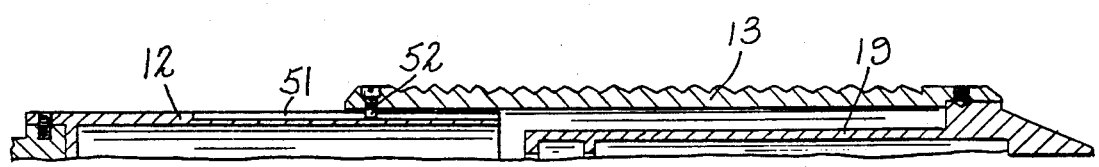
FIG. 6 is a fragmentary view in section of an alternate construction of the lens of FIG. 1.

FIG. 6 illustrates an alternate embodiment of the focusing connection between focusing member 12 and zoom ring 13. An axially directed slot 51 is defined in the outer surface of member 12, and a pin 52 extends through ring 13 into slot 51. This construction is the reverse of that shown in FIG. 1 and still permits the ring 13 to move axially to effect zooming, and to control focusing by rotary motion.

The ring or sleeve 13 serves as a one touch control or operating member which accomplishes both focusing and zooming.

It may thus be seen that the objects of the invention set forth as well as those made apparent form the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A variable focal length lens of the type including a front focusing lens group and first and second axially movable lens groups for varying the equivalent focal length of the lens, comprising an elongated cylindrical member, a sleeve-like operating member disposed about said cylindrical member adapted to move axially with respect to said cylindrical member for varying the focal length and rotatably with respect thereto for focusing, focusing means threadably mounting said front group to said cylindrical member for focusing movement, means connecting said focusing means to said operating member so that rotation of said operating member produces rotation of said focusing means on said mounting, said connecting means permitting axial movement of said operating member with respect to said cylindrical member without rotation of said focusing means, first and second guide slots defined in said cylindrical member, each having axial and tangential directional components, a first mounting member for said first lens group in said cylindrical member and having a first pin extending therefrom through said first guide slot, an axial slot defined in said first mounting member, a mounting member for said second lens group within said first mounting member, a second pin extending from said second mounting member through said axial slot into said second guide slot, and an annular channel defined in said operating member and receiving said first pin therein.

2. The lens of claim 1 wherein said connecting means comprises a longitudinal slot in said operating member and a pin extending from said focusing member into said longitudinal slot.

3. The lens of claim 1 wherein said connecting means comprises a longitudinal slot in said focusing member and a pin extending from said operating member into said longitudinal slot.

4. The lens of claim 1 wherein said means connecting said focusing means comprises a longitudinal slot in said operating member and a pin extending from said focusing member into said longitudinal slot.

5. A variable focal length lens of the type including a front focusing lens group and first and second axially movable lens groups for varying the equivalent focal length of the lens comprising an elongated cylindrical member, a sleeve-like operating member disposed about said cylindrical member adapted to move axially with respect to said cylindrical member for varying the focal length and rotatably with respect thereto for focusing, focusing means threadably mounting said front group to said cylindrical member for focusing movement, means connecting said focusing means to said operating member so that rotation of said operating member produces rotation of said focusing means, said connecting means permitting axial movement of said operating member with respect to said cylindrical member without rotation of said focusing means, first and second guide means defined in said cylindrical member each having axial and tangential directional components, a first mounting member for said first lens group in said cylindrical member and having a first connection to said first guide means, a second mounting member for said second lens group within said cylindrical member and having a second connection to said second guide means, means connecting said operating member to said first mounting member whereby axial movement of said operating member moves said first mounting member axially and rotatively within said cylindrical member in accordance with said first guide means, and means connecting said first and second mounting members whereby rotative movement of said first mounting member produces movement of said second mounting member in said second guide means.

6. A lens assembly comprising an elongated cylindrical member, a sleeve-like operating member disposed about said cylindrical member adapted to slide axially with respect to said cylindrical member for varying the focal length of said lens throughout a predetermined range of focal lengths, first and second guide slots defined on said cylindrical member, each having axial and tangential directional components, a first mounting member for a first lens group in said cylindrical member and having a first pin extending into said first guide slot, a second mounting member for a second lens group within said cylindrical member and having a second pin extending into said second guide slot, means connecting said operating member to said first pin so that axial movement of said operating member on said cylindrical member moves said first mounting member axially and rotatively within said cylindrical member in accordance with said first guide slot in said cylindrical member and means coupling said first mounting member to said second pin of said second mounting member whereby rotative movement of said first mounting member produces movement of said second mounting member in accordance with the contour of said second guide slot on said cylindrical member, said means connecting said operating member to said first pin comprising an internal groove in said operating member, said groove being so directed that axial motion of said operating member causes the walls defining the groove to impart motion to said pin, but rotative motion of said operating member produces relative movement of said pin in said groove without motion of said first mounting member in said cylindrical member, means for focusing said lens, and means connecting said operating member to said focusing means whereby rotative motion of said operating member is effective to operate said focusing means.

7. The lens assembly of claim 5 wherein said second mounting member is located at least partially within said first mounting member, an slot in said first mounting member, said second pin extending through said slot.

8. A variable focal length lens of the type including first and second axially movable lens groups for varying the equivalent focal length of the lens between predetermined limits, comprising an elongated cylindrical member, a sleeve-like operating member disposed about said cylindrical member adapted to move axially with respect to said cylindrical member for varying the focal length, first and second guide slots defined in said cylindrical member, each having axial and tangential directional components, a first mounting member for said first lens group in said cylindrical member and having a first pin extending therefrom through said first guide slot, an axial slot defined in said first mounting member, a second mounting member for said second lens group within said first mounting member, a second pin extending from said second mounting member through said axial slot into said second guide slot, and means coupling said first pin to said operating member such that axial motion of said operating member with respect to said cylindrical member produces axial and rotative motion of said first and second mounting members in accordance with said guide slots.

9. A variable focal length lens of the type including a front focusing lens group and first and second axially movable lens groups for varying the equivalent focal length of the lens comprising an elongated cylindrical housing member, an operating member disposed about said housing member adapted to move axially with respect to said housing member for varying the focal length and rotatably with respect thereto for focusing, focusing means threadably mounting said front group to said cylindrical member for focusing movement, means connecting said focusing means to said operating member so that rotation of said operating member produces rotation of said focusing means, said connecting means permitting axial movement of said operating member with respect to said housing member without rotation of said focusing means, first and second guide means defined in said housing member each having axial and tangential directional components, a first mounting member for said first lens group in said housing member and having a first connection to said first guide means, a second mounting member for said second lens group within said cylindrical member and having a second connection to said second guide means, first means connecting said operating member to said first mounting member whereby axial movement of said operating member moves said first mounting member axially and rotatively within said cylindrical member in accordance with said first guide means, and second means connecting said first and second mounting members whereby movement of said first mounting member produces movement of said second mounting member in accordance with said second guide means.

10. The lens of claim 9 wherein the first guide means is a slot in said housing member, the means connecting said operating member to said first mounting member comprises an annular channel in said operating member, and a pin on said first mounting member extending through said first guide means into said channel.

11. A variable focal length lens of the type including a front focusing lens group and first and second axially movable lens groups for varying the equivalent focal length of the lens comprising an elongated cylindrical housing member, an operating member disposed about said housing member adapted to move axially with respect to said housing member for varying the focal length and rotatably with respect thereto for focusing, focusing means threadably mounting said front group with respect to said cylindrical member, means connecting said focusing means to said operating member so that rotation of said operating member produces rotation of said focusing means, said connecting means permitting axial movement of said operating member with respect to said cylindrical member without rotation of said focusing means, first and second guide means defined in said housing member, said first guide means having an axial directional component and said second guide means having axial and tangential directional components, a first mounting member for said first lens group within said housing member and having a first connection to said first guide means in said housing member, a second mounting member for said second lens group within said housing member and having a second connection to said second guide means in said housing member, first means connecting said operating member to said first mounting member whereby axial movement of said operating member moves said first mounting member axially within said housing member in accordance with said first guide means, and second means connecting said first and second mounting members whereby movement of said first mounting member produces movement of said second mounting member within said housing member in accordance with said second guide means.

12. The lens of claim 11 wherein the first guide means is a slot in said housing member, the means connecting said operating member to said first mounting member comprises an annular channel in said operating member, and a pin on said first mounting member extending through said first guide means into said channel.

13. The lens of claim 11 wherein said second guide means is a slot in said housing member, a pin extending from said second mount into said slot and said means connecting said first and second mounting members is a slot in said first mounting member engaged by said pin.

14. A lens assembly as claimed in claim 11, wherein said first guide means comprises at least one guide way formed in one of said first mounting and the operating member and a guide pin rigidly provided in the other one of said first mounting and said operating member and slidably engaged in said guide way, said guide way extending in parallel relation to the longitudinal axis of the lens, and wherein said first mounting is threadably carried by the housing member at the front thereof.

15. A lens of the type having first and second lens groups axially movable to vary the equivalent focal length of the lens, comprising a tubular member having first and second guide slots therein for predetermining axial movement of said first and second lens groups, first and second mounts for said first and second groups in said tubular member, a follower pin extending from each of said mounts into one of said slots, one of said mounts having an elongated slot therein receiving the pin of the other mount, an operating member slidable longitudinally of said tubular member, said operating member connected to the pin of said one of said mounts whereby as said operating member is moved longitudinally to move said one of said mounts in its guide slot, the edges of said elongated slot contact and move the follower pin of the other of said mounts in its guide slot.

16. The lens of claim 15 wherein said guide slots have both axial and tangential components in said tubular member.

* * * * *

UNITED STATES PATENT AND TRADEMARK OFFICE
CERTIFICATE OF CORRECTION

PATENT NO. : 4,097,124
DATED : June 27, 1978
INVENTOR(S) : RINZO WATANABE ET AL

It is certified that error appears in the above-identified patent and that said Letters Patent are hereby corrected as shown below:

Column 3, line 50, "slots 3" should read --slots S--.

Column 6, line 6 of claim 9, "housing" should read --cylindrical--.

Signed and Sealed this

*Twenty-second* Day of *May 1979*

[SEAL]

Attest:

RUTH C. MASON
*Attesting Officer*

DONALD W. BANNER
*Commissioner of Patents and Trademarks*